US00H002221H

(19) United States
(12) Statutory Invention Registration
LaMoy et al.

(10) Reg. No.: US H2221 H
(43) Published: Aug. 5, 2008

(54) AIR SUPPLY SYSTEM PARTICULARLY SUITED TO REMOVE CONTAMINANTS CREATED BY CHEMICAL, BIOLOGICAL OR RADIOLOGICAL CONDITIONS

(75) Inventors: Craig S. LaMoy, King George, VA (US); Michael A. Pompeii, Fredericksburg, VA (US); Charles K. Atwell, King George, VA (US); W. Dale Craig, King George, VA (US); Bradley A. Repp, Fredericksburg, VA (US); Dallas Wayne Culbertson, King George, VA (US)

(73) Assignee: The United States of America as represented by the Secretary of the Navy, Washington, DC (US)

(21) Appl. No.: 10/021,682

(22) Filed: Nov. 30, 2001

Related U.S. Application Data

(63) Continuation of application No. 09/504,396, filed on Feb. 15, 2000, now abandoned.

(51) Int. Cl.
*B01D 46/30* (2006.01)

(52) U.S. Cl. ..... 95/22

(58) Field of Classification Search ..... 454/187, 454/238, 239, 340; 95/22, 273, 287; 96/134, 96/421, 400; 55/385.2, DIG. 9, 485, 486, 55/487

See application file for complete search history.

(56) References Cited

U.S. PATENT DOCUMENTS 3,218,997 A * 11/1965 Berghout et al. ..... 110/193
4,634,458 A * 1/1987 Craig ..... 210/315
4,838,901 A * 6/1989 Schmidt et al. ..... 55/320
4,838,903 A * 6/1989 Thomaides et al. ..... 55/480
4,962,371 A * 10/1990 Repp et al. ..... 340/286.01
5,327,744 A * 7/1994 Frawley et al. ..... 237/12.3 A
5,385,505 A * 1/1995 Sharp et al. ..... 454/238
5,545,086 A * 8/1996 Sharp et al. ..... 454/229
5,890,367 A * 4/1999 You et al. ..... 454/187
5,910,291 A * 6/1999 Skalla et al. ..... 261/DIG. 26
5,997,619 A * 12/1999 Knuth et al. ..... 55/356
6,152,996 A * 11/2000 Linnersten et al. ..... 55/385.3

* cited by examiner

*Primary Examiner*—M. Clement
(74) *Attorney, Agent, or Firm*—James B. Bechtel, Esq.; Matthew J. Bussan, Esq.

(57) ABSTRACT

Disclosed is an air supply system that provides filtered ventilation to a protected zone which is maintained at a positive pressure so as to prevent contaminants from infiltrating therein. The system further discloses a three-stage air filter apparatus that provides all the necessary filtering to remove contaminants from the air that may be created by chemical, biological and radiological conditions.

19 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR SUPPLY SYSTEM PARTICULARLY SUITED TO REMOVE CONTAMINANTS CREATED BY CHEMICAL, BIOLOGICAL OR RADIOLOGICAL CONDITIONS

CROSS REFERENCE TO RELATED APPLICATIONS

This is a Continuation of Ser. No. 09/504,396, which was filed on Feb. 15, 2000, and which is now abandoned.

STATEMENT OF GOVERNMENT INTEREST

The invention described herein made be manufactured and used by or for the Government of the United States of America for governmental purposes without any payment of any royalities thereon or therefor.

BACKGROUND OF THE INVENTION 1.0 Field of the Invention

The present invention relates to air filtering systems and, more particularly, to an air supply system that is particularly suited to filter and remove contaminants created by chemical, biological or radiological conditions.

2.0 Description of the Related Art

Tactical locations, such as naval warships and land based buildings used for command information centers, have long been pressurized to protect against airborne intrusion therein of chemical, biological and radiological contaminations. Such a system is disclosed in U.S. Pat. No. 4,962,371, which is incorporated herein by reference. Although the existing systems that provide for a pressurized environment serve well their intended purpose, it is desired that further improvements be provided thereto.

The filters used in such pressurized systems are commonly placed in relatively small environments, such as air ducts. It is desired that a compact filtering apparatus be provided wherein all the filtering required to purge the air of contaminants is located in one compact structure.

The pressurized environment provided by the air filtering systems needs to be maintained at a predetermined positive pressure. It is desired that a system be provided that monitors for the pressure within the enclosed environment and maintains the pressure therein within a desired limit.

OBJECTS OF THE INVENTION

It is a primary object of the present invention to provide an air filtering system that is particularly suited to filter and remove contaminants created by chemical, biological or radiological conditions.

Another object of the present invention is to provide an air supply system that has a single air filtering apparatus, which houses all of the necessary filtering devices needed to purge the supplied air of contaminants.

It is another object of the present invention to provide for a system that monitors the positive pressure within an enclosed environment or zone protected by the system so as to be within a desired range.

SUMMARY OF THE INVENTION

The invention is directed to an air supply system that is particularly suited to filter out contaminants created by chemical, biological or radiological conditions.

The system comprises a three-stage air filter apparatus and a supply fan. The three-stage air filter apparatus has an input and an outlet, with the input fluidly coupled to the inlet of the air supply system. The three-stage air filter apparatus has first, second and third coaxially arranged annular filters, with the first filter being disposed within the second filter and the second filter being disposed within the third filter. The first filter is located closest to the input of the three-stage air filter apparatus and the third filter is located closest to the output of the three-stage air filter apparatus. The third filter filters and removes particles of at least a first size. The second filter filters and removes aerosols and particles of a size which is less than the first size. The third filter comprises a gas adsorber for removing gases. The air supply system has an input fluidly coupled to the output of a three-stage air filter apparatus and an output fluidly coupled to the air intake means of the protected zone. The supply fan supplies a sufficient flow of air so as to provide the protected zone with a positive pressure.

BRIEF DESCRIPTION OF THE DRAWINGS

A better understanding of the present invention may be realized when considered in view of the following detailed description, taken in conjunction with the accompanying drawings.

DETAILED DESCRIPTION OF THE PREFERRED EMBODIMENTS

Figure 1:
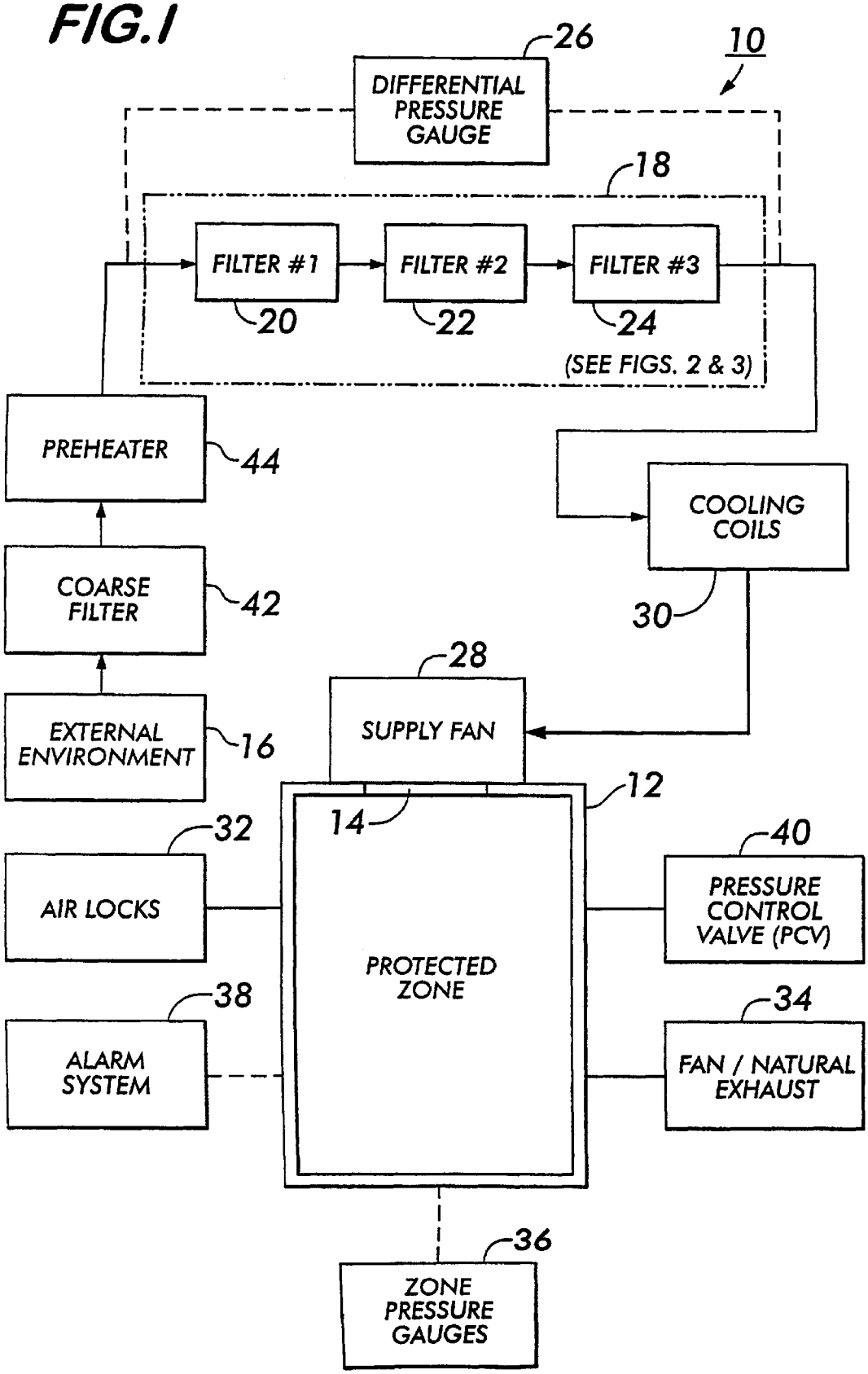
FIG. 1 is a block diagram showing the interrelationship of the elements making up the air supply system of the present invention.

Referring to the drawings, wherein the same reference number indicates the same element throughout, there is shown in FIG. 1 a block diagram showing the interrelationship of the essential elements making up the air supply system 10 of the present invention.

The system 10 supplies an enclosed protected zone 12, having an air intake means 14, with an air supply having an inlet 16 that is coupled to the external environment. The system 10 is particularly suited to provide filtering to remove contaminants created by chemical, biological or radiological conditions.

The protected zone 12 is defined by enclosed boundaries and is airtight. The practice of this invention frees the personnel in this zone from wearing protective masks or clothing, otherwise required to prevent the detrimental effects by the chemical, biological and radiological contamination.

The protected zone 12 is pressurized by supplying air at a sufficient flow and maintaining the positive pressure by providing air tightness of the protected zone 12 itself and by the use of air locks. Maintaining a positive pressure with the protected zone 12 prevents the infiltration therein of the chemical and biological contaminants. The contaminants are removed from the air flowing into the pressurized zone 12 by a three-stage air filter apparatus 18.

The three-stage air filter apparatus 18 has a first filter 20, a second filter 22, and a third filter 24, all of which are annular coaxially arranged filters. The first filter 20 is disposed within the second filter 22, and the second filter 22 is disposed within a third filter 24 in a manner to be further described herein described herein after with reference to FIG. 2. The first filter 20 is physically located closest to the input of the three-stage air filter apparatus 18, and the third filter 24 is physically located closest to the output of the three-stage air filter apparatus 18.

A differential pressure gage 26 is connected between the input and the output of the three-stage air filter apparatus 18 and develops an output proportional to the differences between the pressure sensed therebetween. The differential pressure gauge 26 may be used as a means for verifying the operation of the three-stage air filter apparatus 18, that is, a relatively low value indicated by the gauge 26 is representative that the filters therein are not clogged and that the three-stage air filter apparatus 18 is performing correctly.

The air supply system 10 further comprises a supply fan 28 which preferably is a centrifugal type fan and is also preferably shock-mounted to a structural foundation. The supply fan 28 is selected, in a manner known in the art, so as to supply a sufficient amount of air at a sufficient flow so as to provide the protected zone 12 with a positive pressure of 1.0 inches wg. The supply fan 28 is located on the downstream side of the three-stage filter apparatus 18 and cooling coils 30.

The cooling coils 30 are installed downstream of the three-stage filtering system 18 so as to condition (cool if warm) the supplied air before distributing it to the supply fan 28.

The protected zone 12 further cooperates with air locks 32 known in the art. The air locks 32 are used for the ingress and egress of personnel to and from the protected zone 12 so as to prevent accident contamination of the protected zone 12 during periods of chemical and biological threats.

The protected zone 12 further utilizes fan/natural exhaust equipment 34 known in the art. The exhaust system 34 removes air from the protected zone 12 the amount of which is balanced with the air supplied by system 10 to the protected zone 12 so as to provide and maintain the desired amount of positive pressure within the protected zone 12.

The protected zone 12 further utilizes zone pressure gages 36, which are monitored to ensure that the protected zone 12 is supplied with a positive pressure within a desired range typically from about 0.5 inches (in) wg to about 1.5 (in) wg. The zone pressure gages 36 operatively cooperate with an alarm system 38.

The alarm system 38 monitors the pressure in the protected zone 12 indicated by the zone pressure gauges 36 and provides an audible alarm to alert personnel of low pressure conditions therein. The alarm may be generated when the pressure within the protected zone 12 falls below 0.5 inches wg. Alarm systems are known and one such system is described in the previously incorporated by reference U.S. Pat. No. 4,962,371.

The protected zone 12 further preferably includes an opening with an input and an output, wherein a pressure control valve (PCV) 40 is installed. The pressure control valve (PCV) 40 provides fluid communication between the input and output of the opening and is dimensioned, in a manner known in the art, so as to allow for fluid communication therebetween when the positive pressure within a protective zone is greater than about 1.5 inches wg. Preferably the protected zone 12 includes the use of one pressure control valve 40, which is used to relieve excess air from the protected zone 12 and, thus, prevents excessive pressure therein from creating undesired air leaks.

The air supplied into the protected zone 12 originates from inlet 16, that is preferably directed into a coarse-filter 42. The coarse-filter 42 typically uses a metal mesh to prevent large particles from entering the air supply system 10. The output of the coarse-filter 42 is directed into a preheater 44.

Figure 2:
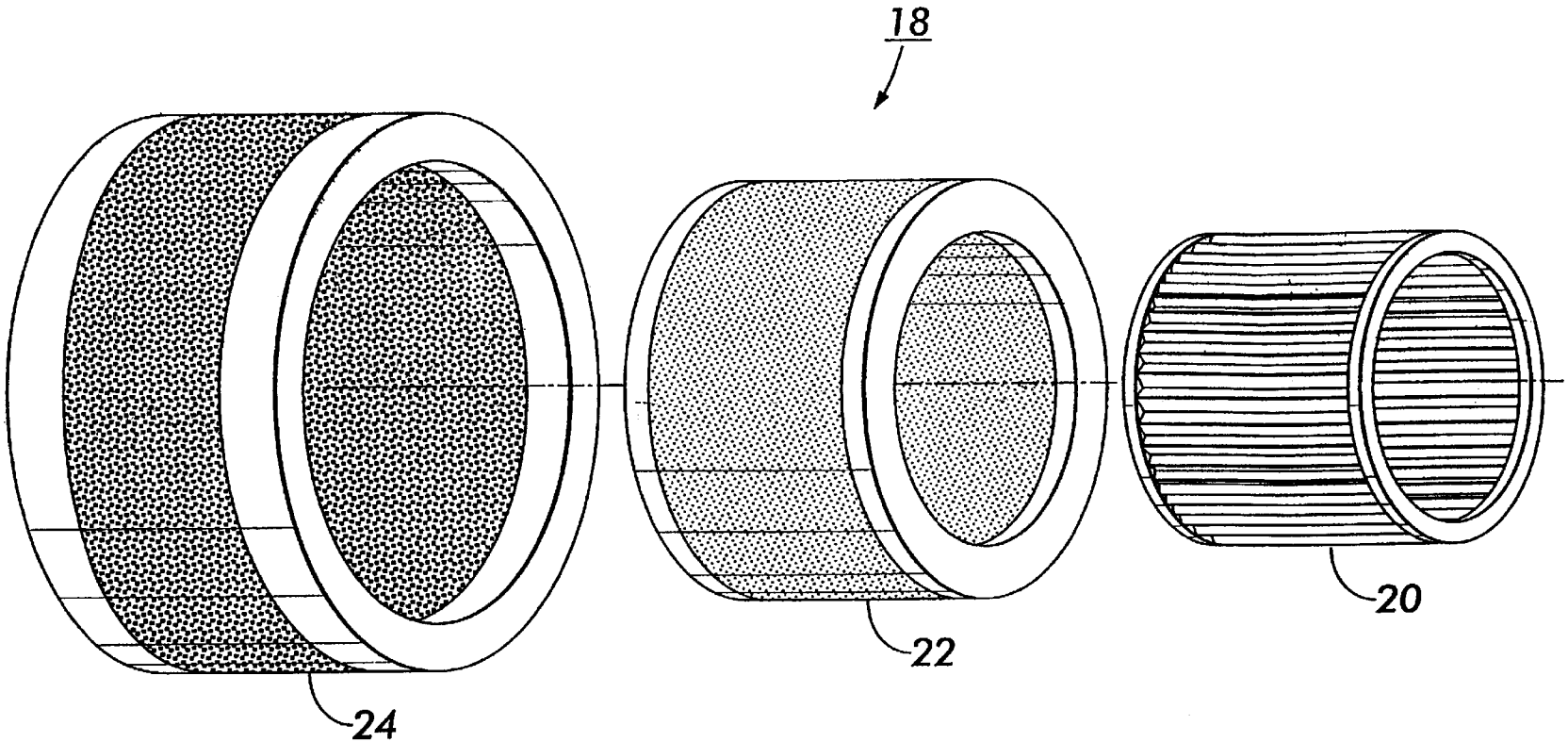
FIG. 2 is a perspective view showing the annular disposed three filters making up the three-stage air filter apparatus of the present invention.

The preheater 44 conditions the air before it enters the three-stage air filter apparatus 18, which may be further described with reference to FIG. 2. As seen in FIG. 2, the three filters 20, 22, and 24 of the three-stage air filter apparatus 18, already discussed with reference to FIG. 1, are annular in shape and coaxially arranged, with filter 20 being dimensioned to be insertable into filter 22 which, in turn, is dimensioned so as to be insertable into filter 24. The filters 20, 22, and 24 are radial flow types, wherein air enters the inner (filter 20) diameter area and flows radially outward through the larger (filter 24) diameter surface. It will be appreciated from FIG. 2 that filters 20, 22, and 24 are free-standing filters. The first filter 20 has a typical outer diameter of twelve (12) inches and has a typical length of 10 inches. The first filter is a pleated-medium which filters and removes particles of at least a first or relatively small size. The second filter 22 filters and removes aerosols and particulates of a size which is less than the first size of the particles being removed by the first filter 20. The second filter 22 is selected of a material, known in the art, for removing solid and aerosol chemical, biological and radiological contaminates. The third filter 24 comprises a gas adsorber which removes gases. The third filter 24 contains activated charcoal (aszmteda charcoal (chromium free)) selected, in a manner known in the art, for removing chemical warfare gases. The placement of the three-stage air filter apparatus 18 and further details thereof within a system, such as that of system 10, may be further described in reference to FIG. 3.

Figure 3:
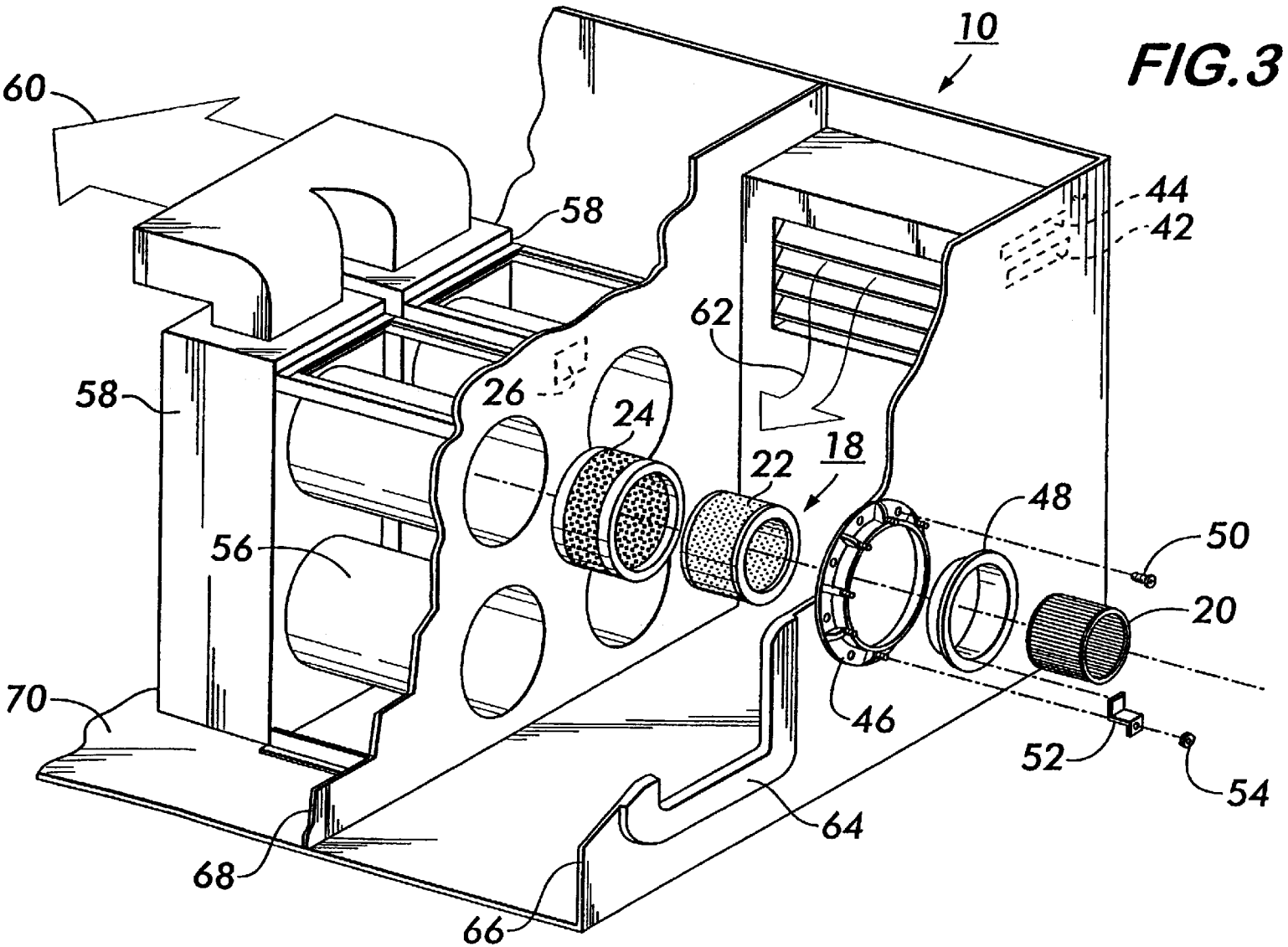
FIG. 3 illustrates the placement of the three-stage air filter apparatus within the air filtering system of the present invention.

FIG. 3 illustrates one three-stage air filter apparatus 18 further having a gas cover 46 that is laced over the third filter 24 and a NEPA cover 48, which is placed over the second filter 22 and a clamp 52, which is over the third filter 20. The gas cover 46 and NEPA cover 48 are attached by a nut 50, whereas the third filter 20 is attached by way of a clamp 52 and a nut 54. It will be appreciated from FIG. 3 that the second and third filters 22, 24 are held in place by retaining mechanisms, e.g., the gas cover 46 and the NEPA cover 48, while the first filter 20 is held relative to the second filter.

The system 10 preferably includes five three-stage air filter apparatuses 18, but only one is shown in FIG. 3 for the sake of clarity. The five three-staged air filter apparatuses 18 are each housed in an opening 56 with each of the filters 20, 22 and 24 disposed inside each opening 56. The openings 56 open into an outlet plenum 58 which has curved upper portions (shown in FIG. 3) that provide an air flow which is directed toward the air supply 28 (not shown).

The input air originally from inlet 16 of FIG. 1 is indicated in FIG. 3 by directional arrow 62, and a watertight access door 64, similar to those used for the air locks 32, is generally indicated by reference number 64 and forms part of a bulkhead 66. The support for the openings 56 is provided by the bulkhead 68 and the structural support of the outer plenum 58 is provided by a deck 70. The output air exiting from the outer plenum 58 is indicated in FIG. 3 by directional arrow 60. The operation of the system 10 can be further described with reference to FIG. 4.

Figure 4:
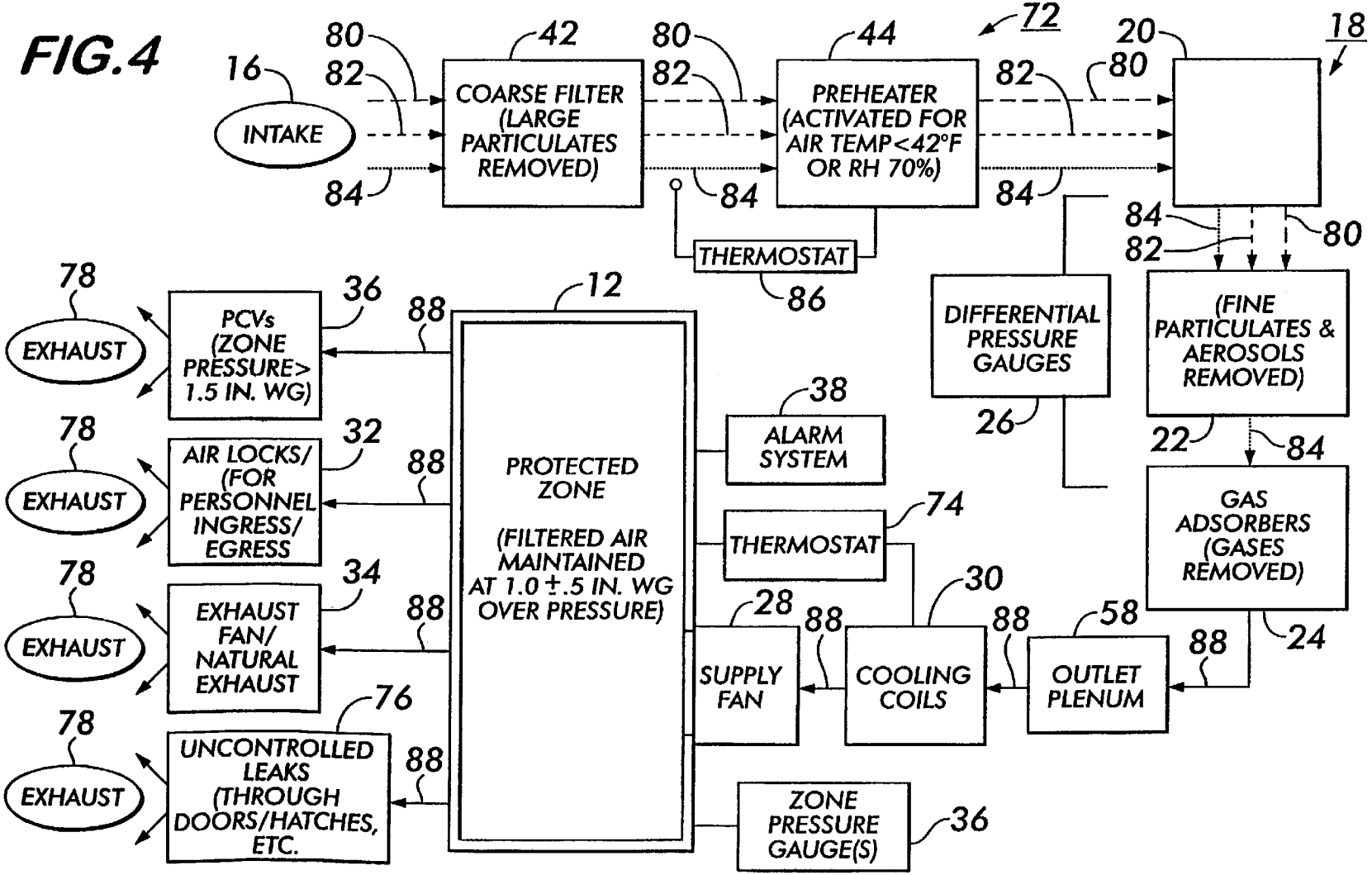
FIG. 4 is a functional flow diagram of the air supply system of the present invention.

FIG. 4 shows a functional flow diagram 72 of the operation of the present invention. FIG. 4 illustrates the elements previously described with reference to FIGS. 1, 2, and 3, but in addition thereto illustrates a thermostat 74 that is used to control the cooling coils 30. FIG. 4 further shows a block 76 that represents controlled leaks through doors, hatches etc., that are treated as exhaust generally identified by the use of reference number 78.

In general the operation of the system 10 includes supplying an adequate amount of air filtration of the air that is used to pressurize the protected zone 12 and monitoring for and maintaining the protected pressurized zone 12 so that its positive pressure is within a desired range of between 0.5–1.5 in. wg.

In operation, the air provided from inlet 16 is divided into three elements, identified in FIG. 4 by three different paths 80, 82 and 84 that respectively represent particulates, aerosols, and gases. The three paths are preferably first intercepted by the coarse-filter 42.

The coarse-filter 42 has typical dimensions of 19.5 by 29.5 inches. The coarse-filter 42 filters out large particulates and then directs the paths 80, 82 and 84 onward to the preheater 44.

The preheater 44 elevates the air passing thereover to a temperature of at least 42° F. and having a relative humidity of about 70%. The preheater 44 is preferably controlled by a thermostat 86. The preheater 44 directs the three paths 80, 82 and 84 onward to the first filter 20.

The first filter 20 removes relatively large particles and then directs the paths 80, 82 and 84 onward to the second filter 22.

The second filter 22 removes fine particulates and aerosols of 0.3 microns or greater with efficiencies of greater than 99.97 from its received air and delivers an output which only comprises gases that are directed to the third filter 24.

The third filter 24 removes the gas by an adsorbtion operation and passes air free, indicated by directional arrow 88, from the contaminants, especially those created by unwanted chemical, biological and radiological conditions, that is directed to the outlet plenum 58 which, in turn, direct the air 88, free from contaminants, onward to the cooling coils 30.

The cooling coils 30, in response to the thermostat 74, supplies the same air 88 free from contaminants to the supply fan 28 which, in turn, provides filtered air 88 free of contaminants into the protected zone 12.

The protected zone 12 is maintained by means of the pressure transducers 36 and its related alarm system 38 as well as the pressure control valves 40 and is supplied with a continuous flow air 88 free from contaminants.

It should now be appreciated that the practice of the present invention provides for an air supply system that is particularly suited to filter out contaminants created by chemical, biological or radiological conditions.

It should be further appreciated that the air supply system utilizes a three-stage air filter apparatus that contains all of the necessary filtering element, and because of its single structure, is conveniently mounted into bulkheads related to the system 10 of the present invention.

Still further is should be appreciated that the present transducer in cooperation with the alarm circuits allows for the monitoring of the protected zone so as to maintain its filtered air within a desired limit, such as 0.5–1.5 inches wg.

While the invention has been described with reference to the specific embodiments, this description is illustrative and is not to be construed as limiting the scope of the invention.

Various modifications will occur to those skilled in the art without departing from the spirit and scope of the invention as defined by the appended claims.

What we claim is:

1. A system for supplying an enclosed protected zone having air intake means with an air supply having an inlet and that is filtered to remove contaminates created by chemical, biological or radiological conditions, said system comprising:

a) a three-stage air filter apparatus having an input fluidly coupled to said inlet and having an output, said three-stage air filter apparatus having first, second and third coaxially arranged annular filters, with the first filter being disposed within the second filter and the second filter being disposed within the third filter, and with the first filter being positioned closest to said input and the third filter being positioned closest to said output, said first filter filtering and removing particulates of at least a first size, said second filter filtering and removing aerosols and particulates of a size which is less than said first size, and said third filter comprising a gas adsorber for removing gases; and b) a supply fan having an input fluidly coupled to said output of said three-stage air filter apparatus and an output fluidly coupled to said air intake means of said protected zone, said supply fan supplying an air at a sufficient enough flow so as to provide said protected zone with a positive pressure.

2. The system according to claim 1 further comprising at least one differential transducer connected between the input and output of the said three-stage air filter apparatus and delivering an output proportional to the difference between the pressure sensed therebetween.

3. The system according to claim 1, wherein said positive pressure of said protected zone is within the range from about 0.5 in wg to about 1.5 in wg.

4. The system according to claim 3 further comprising a transducer connected within said protected zone and delivering an output proportional to the pressure sensed within said protected zone.

5. The system according to claim 4, further comprising an alarm device connected to receive the output of said transducer and generating an alarm signal when said output of said transducer is representative of a pressure of below about 0.5 in. wg.

6. The system according to claim 3, wherein said protected zone has an opening with an input and an output and wherein said system further comprises a pressure control valve (PCV) fluidly coupled between the input and output of said opening of said protected zone and is dimensioned so as to allow for fluid communication between said input and output when the positive pressure within said protected zone is greater than about 1.5 in wg.

7. The system according to claim 1 further comprising a coarse filter interposed between said inlet of said supply fan and said input of said three-stage air filter apparatus, said coarse filter filtering and removing particulates having a size which is greater than said first size.

8. The system according to claim 7 further comprising a heater interposed between said coarse filter and said input to said three-stage air filter apparatus, said heater being selected so as to elevate the air flowing thereacross to a temperature of greater than about 42° F. and having a relative humidity of about 70%.

9. The system according to claim 1 further comprising cooling coils interposed between said output of said three-stage air filter apparatus and said input of said supply fan;

10. The system according to claim 1, wherein said first and second and third filters of said three-stage air filter apparatus are selected to remove particulates, aerosols and gas created by chemical, biological or radiological conditions.

11. A method for supplying an enclosed protected zone having air intake means with an air supply having an inlet that is filtered to remove contaminates created by chemical, biological or radiological conditions, said method comprising the steps of:

a) providing a three-stage air filter apparatus having an input fluidly coupled to said inlet and an outlet, said three-stage air filter apparatus having first, second and third coaxially arranged annular filters, with the first filter being disposed within the second filter and the second filter being disposed within the third filter, and with the first filter being positioned closest to said input and the third filter being positioned closest to said output, said first filter filtering and removing particulates of ar least a first size, said second filter filtering and removing aerosols and particulates of a size which is less than said first size, and said third filter comprising a gas adsorber for removing gases; and b) providing a supply fan having an input fluidly coupled to said output of said three-stage air filter apparatus and an output fluidly coupled to said air intake means of said protected zone, said supply fan supplying a sufficient flow of air so as to provide said protected zone with a positive pressure within the range from about 0.5 in wg. to about 1.5 in wg.

12. The method according to claim 11 further comprising step of arranging at least one differential transducer between the input and output of the three-stage air filter apparatus and delivering an output proportional to the difference between the pressure sensed therebetween.

13. The method according to claim 11, further comprising the step of arranging a transducer within said protected zone and delivering an output proportional to the pressure sensed therein.

14. The method according to claim 13, further comprising the step of providing an alarm device connected to receive the output of said transducer and generating an alarm signal when said output of said transducer is representative of a pressure of below about 0.5 in wg.

15. The method according to claim 11, wherein said protected zone has an opening with an input and an output and wherein said method further comprises the step of:

a) providing a pressure control valve (PCV) fluidly coupled between the input and output of said opening of said protected zone; and c) dimensioning said PCV to allow for fluid communication between said input and output when the positive pressure within said protected zone is greater than about 1.5 wg.

16. The method according to claim 11 further comprising the step of:

a) providing a coarse filter interposed between said inlet of said supply fan and said input of said three-stage air filter apparatus, said coarse filter filtering and removing particulates having a size which is greater than said first size.

17. The system according to claim 16 further comprising the step of:

a) providing a heater interposed between said coarse filter and said input to said three-stage air filter apparatus; and:

b) dimensioning said heater to elevate the air flowing thereaccross to a temperature of greater than about 42° F. and having a relative humidity of about 70%.

18. A system for supplying an enclosed protected zone with air cleaned of chemical, biological, and radiological contaminants at a flow rate sufficient to maintain a positive pressure within the protected zone, comprising:

a free-standing first filter that filters and removes particulates of at least a first size from the air;

a free-standing second filter that filters and removes aerosols and particulates of a size which is less than the first size from the air;

a free-standing third filter that adsorbs gases from the air; and a blower pneumatically coupling the downstream side of the third filter with the protected zone, wherein:

the first, second and third filters are annular filters axially nested one inside the other in the recited order; and the first, second, and third filters are radial flow filters.

19. The system according to claim 18, further comprising:

a filter housing including an axial opening for receiving the first, second, and third filters, and an annular opening receiving cleaned air from the downstream side of the third filter, and a plenum pneumatically coupling the annular opening and the blower.

* * * * *